3,337,601
PROCESS FOR THE PRODUCTION OF
ALCOHOL SULFATES
Nelson Whitman, Wilmington, Del., assignor to E. I. du Pont de Nemours and Company, Wilmington, Del., a corporation of Delaware
Filed Mar. 3, 1964, Ser. No. 349,010
3 Claims. (Cl. 260—459)

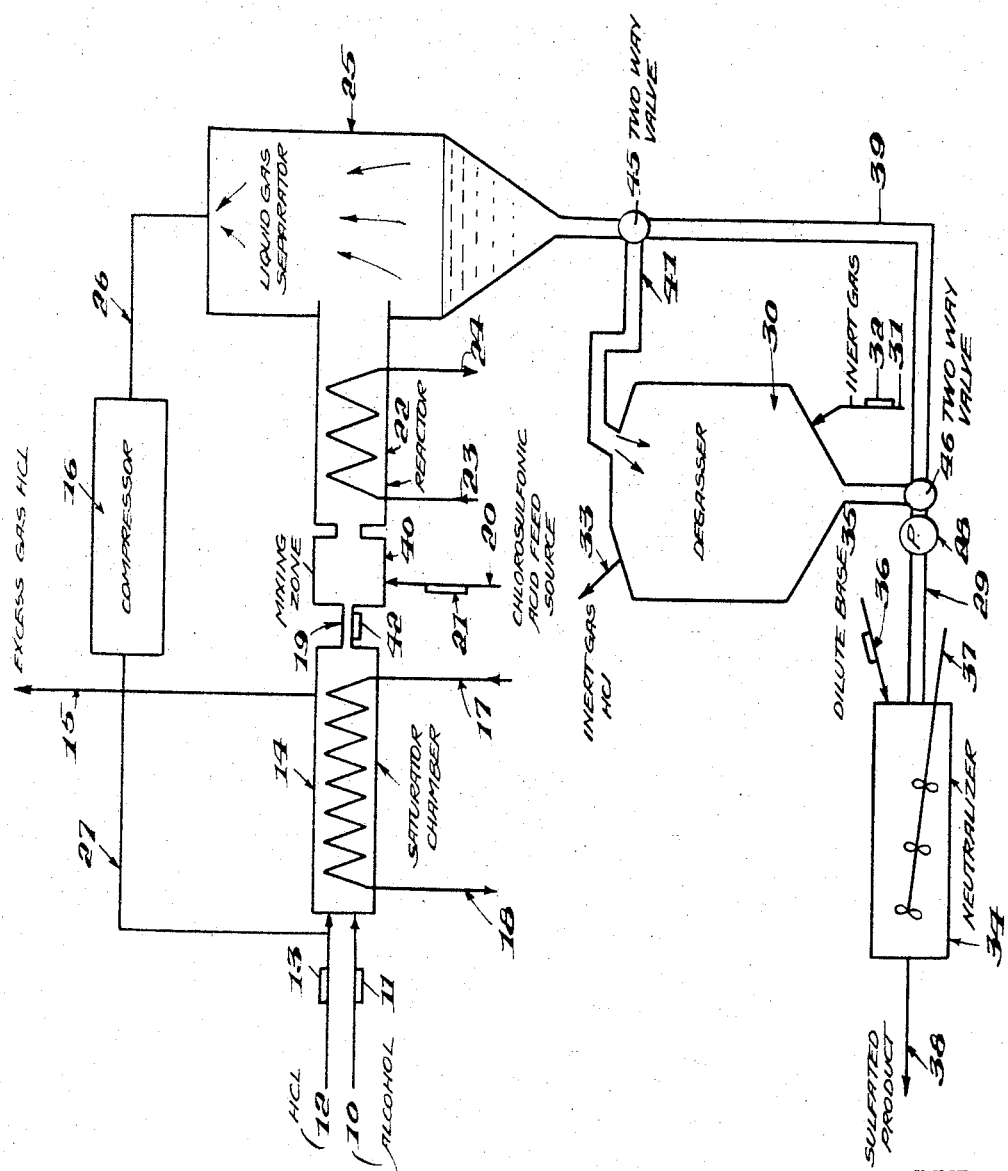

This invention is directed to both an integrated system and a continuous process for the production of alcohol sulfates.

Alcohol sulfates are important surface active agents widely used in detergent compositions. Their application in the detergent field has recently gained impetus since they are biodegradable and appear to avoid the pollution of surface waters. They are also extensively used as emulsifiers in polymerization systems, such as in the emulsion polymerization of vinyl chloride. The large increase in demand for alcohol sulfates has thereby necessitated a satisfactory process for their production on a large scale.

The reaction of a long chain aliphatic alcohol having 8–22 carbon atoms with chlorosulfonic acid is highly exothermic. Unless the reaction is carefully controlled, excessive heat, excess sulfating agent and prolonged reaction time will cause deterioration of the sulfated product and give rise to side reactions. Such deterioration of the sulfated product and generation of by-products in side reactions tend to discolor the sulfated mass. Thus, in order to obtain a light-colored product, the major problem in the sulfator is to minimize the formation of this color in the sulfated mass.

It is an object of the present invention to provide a continuous process for the production of alcohol sulfates.

It is another object of the present invention to produce a high quality alcohol sulfate product in high yield.

It is a further object of the present invention to provide an integrated system or apparatus for sulfating fatty alcohols.

These and other objects will become apparent from the following description and claims.

More specifically, the present invention is directed to a continuous process for the preparation of alcohol sulfates, which process comprises continuously saturating a $C_{8-22}$ straight chain primary aliphatic alcohol with hydrogen chloride at 1 to 4 atmospheres in a saturation zone, cooling the alcohol to above the freezing point of the alcohol, simultaneously and continuously introducing the alcohol and chlorosulfonic acid into a pipeline reactor wherein the residence time is maintained at 1 to 30 seconds, continuously removing the sulfation mass from said reactor and introducing said mass into a liquid-gas separation zone, continuously driving off by-product hydrogen chloride in said separation zone, continuously stripping the remaining dissolved hydrogen chloride from the reaction mass if this is required, continuously removing the liquid product from said separation zone and introducing said mass into a neutralizing zone, continuously neutralizing the reaction mass with a stoichiometric amount of a dilute, aqueous solution of a base and continuously recovering the corresponding essentially water white alcohol sulfate product.

It has been unexpectedly discovered that degradation of the ester takes place after the reaction of the alcohol and chlorosulfonic acid and contributes greatly to the problem of color in the alcohol sulfate product. Thus in order to obtain a product low in unsulfated materials and of improved color the major problem is to eliminate degradation in the degassing and neutralizing steps. Hence, it was most surprising and unexpected that a rapid, continuous operation of the sulfation process in an integrated system as described in this invention would provide a vastly improved sulfated alcohol in such high yields and effectively reduce this degradation problem. By the continuous process of the present invention, products are obtained in high conversions which are lighter in color and lower in salt content than those currently manufactured.

It was also surprising and unexpected that the continuous process and compact, integrated system disclosed herein would produce such a large quantity of high grade product per unit time, particularly in view of the dimensions of the unit with respect to the output.

Another unexpected advantage of operating the process continuously is that, unlike the batch processes, the entire system can proceed with minimum temperature control after the alcohol has been saturated with hydrogen chloride and cooled to just above the freezing point of the solution. After this point the temperature is allowed to rise normally without harmful effects. A distinct advantage of the continuous process is that the neutralization of the ester may be performed without cooling the mass below normal room temperatures. Thus, with high agitation and short retention time in the neutralization step of the present invention, a substantially colorless product is obtained in which there has been no increase in content of unsulfated alcohol by hydrolysis of the unneutralized ester.

Another unique advantage of the hereinbefore described continuous process is the advantage gained by saturating the alcohol at superatmospheric pressure. It has been determined that saturation at atmospheric pressure removes 9 kilo-calories (about ⅔ mol of hydrogen chloride is dissolved per mol of alcohol), while saturation at four atmospheres pressure removes 13 kilo-calories (about one mol of hydrogen chloride is dissolved per mol of alcohol). Thus by removal of a larger amount of heat of solution, the remaining continuous steps in the process may be conducted at a lower temperature without external cooling. The elimination of external cooling adds greatly to the economic attractiveness of the continuous process.

A still further advantage of the continuous process is that the process, after start-up, can continue to operate without the addition of fresh hydrogen chloride. Once start-up is completed, the hydrogen chloride recycled from the reaction zone is sufficient to saturate the incoming alcohol with hydrogen chloride. Hence, this unique process can function continuously after start-up with only the addition of alcohol and chlorosulfonic acid.

More specifically, an important characteristic of the present invention is that the continuous process is carried out in a compact, integrated system. Many of the distinct advantages of the continuous process, such as improved color, minimum contamination of the product, and the ability to operate the majority of the process with minimum temperature control, flow, in part, from this unique integrated system.

The compact, integrated system for sulfating organic alcohol of the present invention will be better understood by reference to the accompanying drawing which illustrates a representative and preferred embodiment of this integrated system.

In the drawing, the integrated reaction system shows an alcohol feed source 10, an alcohol flow meter 11 for controlling the flow of alcohol, a hydrogen chloride feed source 12 for start-up purposes only, a hydrogen chloride flow meter 13 for controlling the flow of hydrogen chloride gas, both feed sources feeding their respective materials into the saturator chamber 14. Any excess hydrogen chloride is vented from the saturator through line 15. For operating at above atmospheric pressure, in which case hydrogen chloride under pressure will be required, the saturator chamber 14 is pressurized. The pressure for the hydrogen chloride can be generated by using a source of hydrogen chloride under pressure or by compressing the hydrogen chloride recycled from the liquid-gas separator 25 in the compressor 16. The saturator chamber 14 is equipped to provide cooling by heat exchange, the cooling liquid entering at 17 and exiting at 18. The retention time of the alcohol in the saturator 14 has no effect on the quality of the product. The saturated alcohol flows continuously out of the saturator chamber 14 by the discharge line 19 through a metering device 42. It is advantageous, but not necessary, to have additional cooling in the lines between the saturator 14 and the reactor 22. In the line between the metering device 42 and the reactor 22 is a mixing zone 40 wherein the saturated alcohol and chlorosulfonic acid are intimately contacted. The chlorosulfonic acid is introduced into the mixing zone 40 from a chlorosulfonic acid feed source 20 through a flow meter 21 which controls the flow of the chlorosulfonic acid into the mixing zone 40. The chlorosulfonic acid and saturated alcohol are mixed thoroughly by the addition of the acid to the alcohol in the mixing zone. Additionally, the reactants can be further mixed by any conventional means to insure thorough contact of the reactants. The mixed reactants flow into the reactor and remain in the reactor for about 1 to 30 seconds. This reaction time is critical to guarantee a high quality product. The reactor chamber 22 may be equipped for heat exchange (the heat exchange is useful to prevent the freezing of the mixture when sulfating high melting point alcohols). If heating is desired, the heating liquid flows co-currently with the reactants entering at 23 and exiting at 24. The reactor opens into and communicates with the liquid-gas separator 25 wherein the hydrogen chloride gas (both from saturation and the reaction) is separated from the reaction mass for recycle to the saturator via the intake line 26, the compressor 16, and hydrogen chloride feed back line 27. After start-up, this recycled hydrogen chloride is sufficient to saturate the fresh alcohol in the saturator. In the liquid-gas separator 25, the reaction mass flows continuously to the bottom of the vessel where it is desirable to have a liquid hold-up of several minutes. If desired, a separate vessel may be used to hold-up the liquid at this point in the system. This hold-up provides for completion of the reaction if the mixing in the reactor is inadequate and permits further separation of the dissolved hydrogen chloride gas. Agitation in the liquid-gas separator 25 may be used, but it is not necessary. The temperature in the liquid-gas separator remains at 25°–40° C. From the bottom of the liquid-gas separator, the sulfated alcohol flows by gravity through line 41 into the top of the degasser 30 or directly into the neutralization chamber 34 via line 39. Valves 45 and 46 are adapted to direct the flow either through the degasser or directly to the neutralization chamber. Whether the product is further degassed or not depends on whether a product low in halide content is desired or required. If a low halide product is desired, further removal of hydrogen chloride gas dissolved or entrained in the sulfated alcohol may be accomplished in the degasser 30. The degasser 30 may be a packed column operating at atmospheric pressure with gravity flow of the sulfation mass down through the column. An inert gas source 31, such as nitrogen, is fed through the flow meter 32 into the bottom of the column under pressure. The inert gas flows up the column counter-current to the flow of the sulfated alcohol and is vented with hydrogen chloride through line 33. The degasser may be operated under reduced pressure with or without the countercurrent flow of an inert scrubbing gas to remove the dissolved hydrogen chloride. At the bottom of the degasser 30 the degassed alcohol sulfate is forced by a feed pump 28 through line 29 into the neutralizing chamber 34. A dilute base source 35 feeds into the neutralizer through flow meter 36. The sulfated alcohol and the dilute base are thoroughly mixed in the neutralizing chamber by a mixer 37. After neutralization the product alcohol sulfates are withdrawn through product line 38.

Satisfactory operation of the neutralizer is dependent upon very thorough mixing of the viscous sulfation mass with at least a stoichiometric amount of dilute base (normally 6–7% sodium hydroxide although other bases may be used, e.g., diethanolamine). To further insure mixing, the neutralizer can be equipped with baffles. A short retention time in the neutralizer is preferred. Rapid mixing of the sulfation mass with the base is essential to avoid hydrolysis of the sulfuric acid ester formed in the sulfator. As heretofore described, this hydrolysis reaction is one of the major causes for the existence of unsulfated alcohols in the product.

By the use of the continuous process hereinbefore described, a means is provided for improving the color of alcohol sulfates while improving their purity as expressed by chemical analyses. In addition it is estimated that the cost of installing such facilities is less than half that for installation of batch facilities of equal capacity and quality. Moreover, the small size of the continuous integrated system permits construction of "packaged" or "integrated" sulfators for installation at various locations.

The alkanols and alkenols which can be utilized as starting materials in the present invention are straight chain, primary alcohols having 8 to 22 carbon atoms. They may be saturated or unsaturated. Representative examples of such alcohols are octyl, nonyl, decyl, lauryl, tetradecyl, cetyl, hexadecenyl, octadecenyl, octadecadienyl, stearyl, nonadecyl, eicosyl and docosanyl.

Representative examples illustrating the present invention are as follows. All parts are by weight unless specified otherwise.

EXAMPLE I

Technical lauryl alcohol ("Lorol" No. 5) at 334 gms./min. (1.69 mols) and hydrogen chloride at 40½ gms./min. (1.11 mols) were metered into a pipeline saturator consisting of 50 ft. of ⅜-in. tubing coiled into a water bath held at 21° C. The solution of hydrogen chloride in alcohol (at 21.4° C.) flowed into a T in which it was mixed intimately with a stream of 186 gms./min. (1.60 mols) of commercial chlorosulfonic acid. The reaction mass, now in two phases because of the evolution of hydrogen chloride, flowed through a reactor chamber constructed from 4 ft. of ⅜-in. tubing jacketed with four 6-in. sections through which was flowing water at a temperature of 5° C. At the end of the reactor chamber the sulfated alcohol flowed into the liquid-gas separator vessel, which had a volume of 18 liters.

From the bottom of the separator, the sulfation mass flowed by gravity first through a hold tank (retention volume about 1 liter, retention time about 2 min.) through which was bubbled a slow stream of nitrogen. [Samples neutralized at this point normally showed about 0.5% sodium chloride in a solution of 30% sodium lauryl sulfate.] From the hold tank the sulfation mass flowed by gravity through a column 24 in. high and 2 in. I.D. packed with ½-in. Berl saddles. Nitrogen flowed upward at a rate of 2.7 liters/min. and exited at the top of the column. From the bottom of the column the sulfation mass was pumped into the neutralizer flask (1500 ml.) along with an excess of 6.3% sodium hydroxide solution (about 1190 gms./min.—1.87 mol). The neutralized product flowed from the neutralizer into a storage container at about 1750 gms./min. Analysis of this product gave the results compiled in Table I. The mole ratio of acid to alcohol was 0.95.

Table I

|   | Percent |
|---|---|
| HCl saturated in alcohol [1] | 10.9 |
| Sulfated alcohols | 19.5 |
| [Equiv. to sodium lauryl sulfate | [2] 29.7] |
| Unsulfated alcohols | 0.4 |
| Sodium chloride | 0.5 |
| Sodium sulfate | 0.5 |
| Light transmission [3] | 94.0 |
| Conversion | 98.0 |

[1] Hydrogen chloride content of saturated alcohol at one atmosphere at 30° C. is 11.5%.
[2] Sulfated alcohol×1.52.
[3] Light transmission is a critical test for determination of the amount of color in the product. This test was conducted by passing light through 40 gms. of the product solution diluted to 100 gms. in a 20 mm. cell. The transmission is recorded as relative to water at a wave length of 410 mμ. Batch reactions of 94% conversion transmit not more than 91%.

EXAMPLE II

In the same equipment as used in Example I about 39 gms./min. of hydrogen chloride were dissolved in 338 gms./min. of technical oleyl alcohol and this solution reacted with 171 gms./min. of chlorosulfonic acid. The degassed reaction mass was neutralized with a solution of 6.3% sodium hydroxide in water. Analysis of the product gave the results compiled in Table II. The mole ratio of acid to alcohol was 1.10.

Table II

|   | Percent |
|---|---|
| Sulfated alcohols | 21.2 |
| [Equiv. to sodium oleyl sulfate | 29.7] |
| Unsulfated alcohols | 1.5 |
| Sodium chloride | 0.3 |
| Sodium sulfate | 0.6 |
| Transmission [1] | 90.5 |
| Conversion | 93.0 |

[1] Transmission was measured through a 1.5% solution, at 410 mμ in a 20 mm. cell. The same test on product made by a batch process gave 87.0% transmission.

EXAMPLE III

In this example, a procedure was used similar to that used in Example I but without the cooling in the jackets around the reactor tube. Analysis of the product gave the results compiled in Table III. The mole ratio of acid to alcohol was 0.95.

Table III

|   | Percent |
|---|---|
| Sulfated alcohols | 20.4 |
| [Equiv. to sodium lauryl sulfate | 31.0] |
| Unsulfated alcohols | 0.9 |
| Sodium chloride | 0.6 |
| Sodium sulfate | 0.5 |
| Transmission [1] | 93.4 |
| Conversion | 96.0 |

[1] Measured under the conditions used in Example I. In comparing transmission percentage, it should be noted that the difference in transmission between Example I and Example III is not significant. Therefore cooling the reactor is not considered essential with this alcohol and under the described set of reaction conditions.

EXAMPLE IV

Technical lauryl alcohol at 356 gms./min. (1.78 mols/min.) was pumped into the top of a 3 in. I.D. glass column and packed to a depth of 3½ ft. with ½-in. porcelain saddles. From the bottom of the column, the liquid flowed into a 10-gallon glass-lined steel kettle equipped with agitation and a water jacket (water temperature 19° C.). From the bottom of the kettle liquid was recycled to the top of the column at a rate of about 1000 gms./min. through a heat exchanger consisting of 50 ft. ⅜-in. tubing in a water bath at 23° C. Inlet and outlet temperatures across the heat exchanger were 32° and 27° C. respectively. The by-product hydrogen chloride from the top of the liquid-gas separator was recycled into the top of the 10-gallon kettle and passed from this up through the packed column. From the bottom of the kettle liquid was pumped at a rate of 1.78 mols alcohol/min. into the tubular reactor used in Examples I and III. Chlorosulfonic acid was metered in to this reactor at 206 gms./min. (1.77 mols/min.). No heat exchange was used in the reactor. Liquid was separated from the by-product hydrogen chloride in the same separator and the liquid flowed through the same degassing system and neutralizer as in Examples I and III. The alcohol product was neutralized with 6% sodium hydroxide (1250 gms./min.-1.88 mols/min.). There was no nitrogen flow through the degassing column. Any hydrogen chloride recycled back to the 10-gallon kettle which was not dissolved in the alcohol flowed to a disposal system. The concentration of the hydrogen chloride dissolved in the alcohol was at least 10%. Analysis of the product gave results compiled in Table IV. The mol ratio of acid to alcohol was 0.99. The viscosity of the product was 130 centipoises at 80° F.

Table IV

|   | Percent |
|---|---|
| Sulfated alcohols | 19.2 |
| [Equiv. to sodium lauryl sulfate | 29.3] |
| Unsulfated alcohols | 0.9 |
| Sodium chloride | 0.4 |
| Sodium sulfate | 0.5 |
| Transmission [1] | 93.6 |
| Conversion | 95.5 |

[1] Measured as in Example I.

In comparing the results of this example with the results obtained in Examples I and III, it should be noted that the mol ratio of acid to alcohol does not appear to affect the yields of the product. The one to one ratio of Example IV substantially gives the same conversion as Example I which used a 0.95 mol ratio of acid to alcohol.

EXAMPLE V

To a batch of about 7 gallons of technical lauryl alcohol manufactured from α-olefines was added hydrogen chloride (from a cylinder) until the hydrogen chloride content was 11.6%. This solution was pumped to the tubular reactor used in the previous examples at a rate of 380 gms. per minute (1.71 mols of 100% alcohol) along with chlorosulfonic acid at 194 gms./min. (1.66 mols/min.). No heat exchange was used on the reactor. Liquid was separated from the by-product hydrogen chloride in a separator similar to that used in Example I and the liquid flowed through a similar degassing system with the same flows of nitrogen specified in Example I. The reaction mass was neutralized using about 1120 gms./min. 6% sodium hydroxide solution (1.68 mols./min.) in a unit similar to that used in Example I. Analysis of the product gave the results compiled in Table V. The acid to alcohol mol ratio was 0.97.

Table V

|   | Percent |
|---|---|
| Sulfated alcohols | 19.1 |
| [Equiv. to sodium lauryl sulfate | 29.0] |
| Unsulfated alcohols | 1.5 |
| Sodium chloride | 0.3 |
| Sodium sulfate | 0.6 |
| Transmission [1] | 92.5 |
| Conversion | 92.7 |

[1] The transmission was equivalent to materials from alcohols from coconut oil.

It is to be understood that the preceding examples are representative and that said examples may be varied within the scope of the total specification, as understood by one skilled in the art, to produce essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A continuous process for the preparation of alcohol sulfates, which process comprises continuously saturating an unsubstituted $C_{8-22}$ straight chain primary alcohol selected from the group consisting of alkanols and alkenols with hydrogen chloride at 1 to 4 atmospheres, cooling said saturated alcohol to above the freezing point of the alcohol, continuously and simultaneously introducing the alcohol and chlorosulfonic acid into a pipeline reactor wherein the residence time of said reactants in the reactor is maintained at 1 to 30 seconds, continuously and rapidly removing the sulfation mass from said reactor and introducing said mass into a liquid-gas separation zone, continuously driving off by-product hydrogen chloride from the reaction mass in the separation zone, continuously removing the reaction mass from said separation zone and introducing said mass into a neutralizing zone, continuously neutralizing said reaction mass with a stoichiometric amount of a dilute, aqueous solution of a base and continuously recovering the corresponding essentially water white alcohol sulfate product.

2. A continuous process for the preparation of alcohol sulfates, which process comprises continuously saturating an unsubstituted $C_{8-22}$ straight chain primary alcohol selected from the group consisting of alkanols and alkenols with hydrogen chloride at 1 to 4 atmospheres in a saturating chamber, continuously cooling said saturated alcohol to above the freezing point of the alcohol, continuously and simultaneously introducing the alcohol and chlorosulfonic acid into a pipeline reactor wherein the residence time of said reactants in the reactor is maintained at 1 to 30 seconds, continuously and rapidly removing the sulfation mass from said reactor and introducing said mass into a liquid-gas separation zone, continuously driving off the by-product hydrogen chloride vapors from the reaction mass and returning said vapors to said saturating chamber, continuously stripping the remaining dissolved hydrogen chloride from the reaction mass in a stripping zone, continuously removing said mass from the stripping zone and introducing said mass into a neutralizing zone, continuously neutralizing the reaction mass with a stoichiometric amount of a dilute, aqueous solution of a base and continuously recovering the corresponding essentially water white alcohol sulfate product.

3. The process of claim 2 wherein said aliphatic alcohol is lauryl alcohol.

References Cited

FOREIGN PATENTS 863,179  3/1961  Great Britain.

CHARLES B. PARKER, *Primary Examiner.*

F. HIGEL, *Assistant Examiner.*